April 18, 1967 R. J. MELVIN, JR 3,315,252

BIPOLAR SIGNAL RECEIVING SYSTEM

Filed April 16, 1964 3 Sheets-Sheet 1

INVENTOR

Raymond J. Melvin, Jr.

BY R. P. Miller

ATTORNEY

United States Patent Office 3,315,252

Patented Apr. 18, 1967

3,315,252

BIPOLAR SIGNAL RECEIVING SYSTEM

Raymond J. Melvin, Jr., Burlington, N.C., assignor to Western Electric Company, Incorporated, New York, N.Y., a corporation of New York Filed Apr. 16, 1964, Ser. No. 360,450

10 Claims. (Cl. 340—347)

This invention relates to a bipolar signal receiving system and more particularly to a pulse receiving system wherein narrow bipolar pulses which may vary over a wide range of magnitudes are received and converted into analog voltage conditions.

In certain communication systems such as radar, television, and missile guidance systems, intelligence or video bipolar signals are utilized in connection with accompanying trigger pulses. These bipolar signals are often of extremely narrow width and of varying magnitudes. In the transmission of these signals, there is a problem of separating these signals from accompanying noise signals and then amplifying and stretching the signals to place them in condition to operate suitable recording devices; such as a digital encoder or a video display device.

It is an object of this invention to provide a new and improved bipolar pulse receiving system.

Another object of the invention resides in a receiving circuit responsive to signals of narrow width and varying magnitudes and converting these signals into analog voltage conditions.

A further object of the invention is the provision of a mixer circuit that responds to bipolar input signals to produce amplified, stretched output signals of a single polarity.

An additional object of the invention resides in novel switching circuits for use in a bipolar signal converter wherein the switching circuits are actuated in accordance with the polarity of an input signal to control generation of an output signal which is the algebraic summation of a bias output of the switching circuit and the input bipolar signal.

With these and other objects in view, the present invention contemplates a pulse receiving system for detecting narrow bipolar video pulses of varying magnitudes and then converting these video pulses into unipolar stretched output signals that control suitable encoding or other recording devices.

An input video pulse is extracted from an incoming signal by a gating circuit whereafter its polarity is determined to condition a switching circuit to respond to a delayed trigger pulse to produce a bias output pulse that is utilized to set a mixer circuit to respond to either a positive or negative video input pulse. The gated input video pulse is delayed and then applied to the now conditioned mixer circuit. The output of the mixer circuit is a positive going pulse that includes both the input pulse (a variable) plus a bias voltage (a constant) derived from the actuation of the switching circuit. This positive pulse is utilized to charge a capacitor circuit to a value which is representative of the input video pulse.

Other objects and advantages of the present invention will become apparent upon considering the following detailed description in conjunction with the accompanying drawings, wherein.

GENERAL DESCRIPTION OF OVERALL SYSTEM

Figure 1:
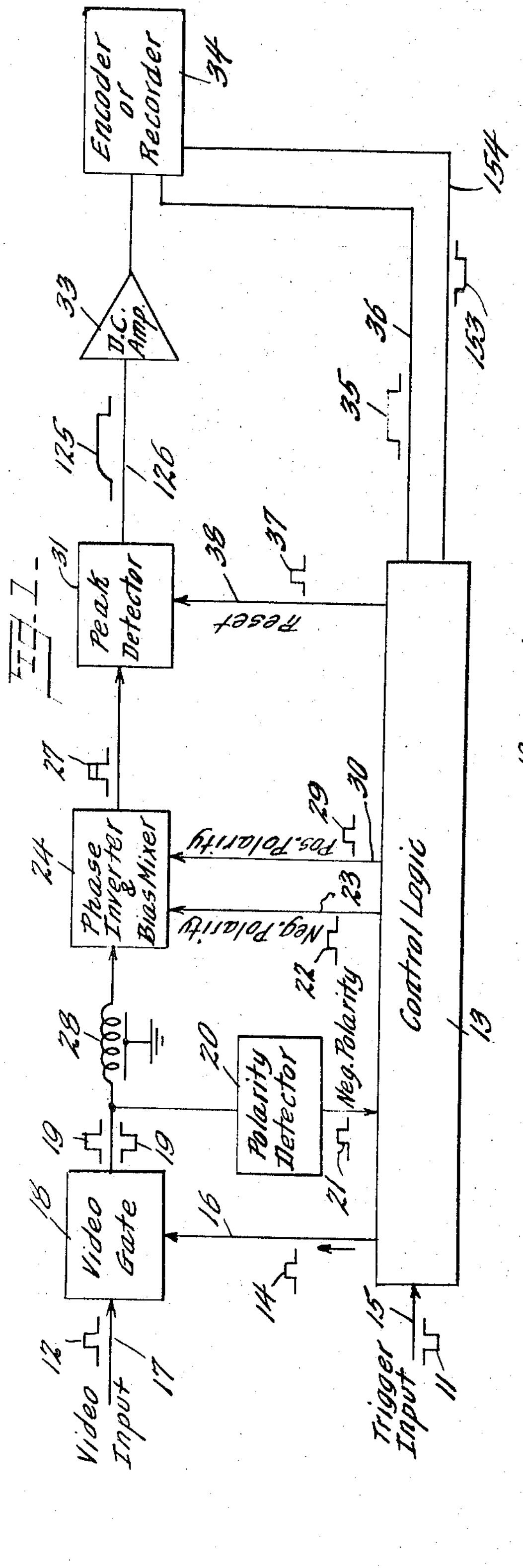
FIG. 1 is a block diagram of a bipolar pulse receiving system embodying the principles of the present invention.
Figure 2:
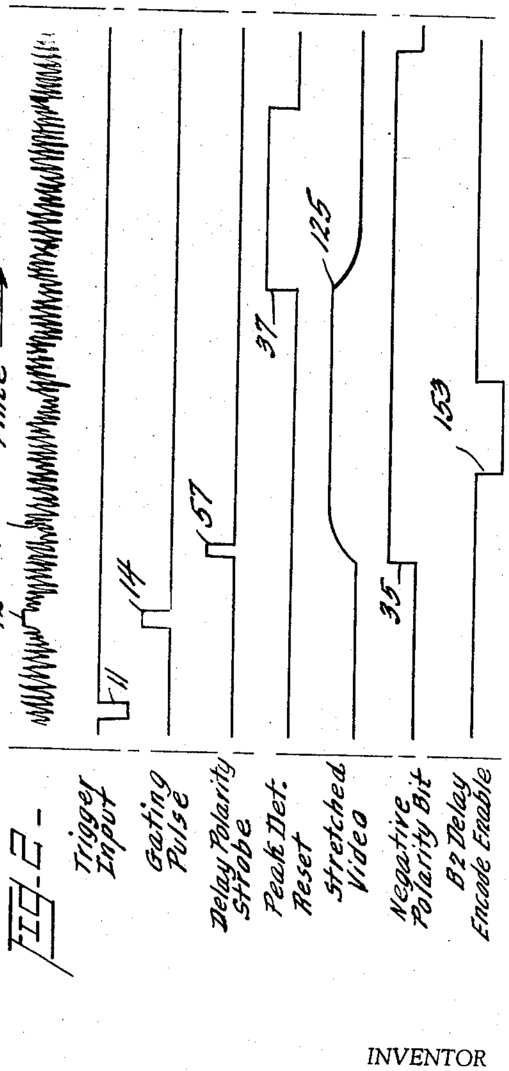
FIG. 2 illustrates the wave forms of several of the signals or pulses applied to or emitted from the principal system components depicted in FIG. 1.

Referring first to FIGS. 1 and 2, an incoming radar or other signal comprises noise 10, a trigger pulse 11, and a video pulse 12 the magnitude of which is indicative of intelligence to be utilized. This intelligence pulse may be utilized to operate a visual display device such as a radar screen or the intelligence pulse may be coded by a digital converter for subsequent utilization. The input trigger pulse 11 is routed to a control logic 13 which functions to provide pulses to operate or condition several other component circuits which are designed to process the input video pulse 12. The input video pulse 12 may be of negative or positive polarity, of varying magnitudes and of very narrow width. The circuit illustrated in the block diagram of FIG. 1 receives the video pulse and converts it into an analog voltage condition which is indicative of the magnitude of the video pulse.

More particularly, the control logic includes well-known commercial facilities for generating a gating pulse 14 in response to the receipt of a trigger pulse 11 at an input terminal 15. The gating pulse 14 is generated and applied over lead 16 after a predetermined time delay from the receipt of the trigger pulse 11 so as to be coincident with the receipt of the video pulse. This video input pulse 12 is applied through an input terminal 17 to a video gate 18 simultaneously with the application of the gating pulse 14. The gate 18 is of commercial design and is adapted to respond to either positive or negative signals to produce output positive or negative pulses 19. Each output pulse 19, however, is free of the noise 10 which accompanied the video pulse 12.

If the output pulse 19 is negative, a polarity detector 20 acts to generate a switching pulse 21 which is fed to the control logic 13 to switch and condition circuits therein to respond to the delayed trigger pulse 11. When the delayed trigger pulse 11 is applied to the conditioned or switched logic circuits, an output bias pulse or gating signal 22 is applied over a lead 23 to a phase inverter and bias mixer circuit 24. The pulse 22 conditions the mixer circuit 24 to respond to a negative gated video pulse 19 to produce an output pulse 27 which is a positive going pulse that is an amplified algebraic summation of the gated video pulse 19 and the bias pulse 22. A delay line 28 is provided to retard the gated video pulse 19 to insure simultaneous application of this pulse on the mixer circuit during the time that the pulse 22 is applied from the control logic 13.

If the gated video pulse 19 is of positive polarity, the polarity detector 20 does not generate an output or switching pulse 21. In this instance, the gated video pulse is delayed in line 28 and then applied to the bias mixer 24 at the same time that the control logic applied a bias pulse or gating signal 29 over a lead 30. This pulse 29 is also generated in response to the operation of the switching circuits in response to the application of the delayed trigger pulse 11.

In the bias mixer 24, the gated video signal 19 is algebraicaly added to the bias pulse 22 or 29 to produce the composite pulse 27 which, in effect, is the video pulse piggyback on top of the bias pulse. The composite pulse 27 is applied to a peak detector 31 which, accordingly, charges a capacitor circuit to produce an analog voltage condition which is an amplified representation of the magnitudes of the input video pulse 12 plus the bias pulse 22 or 29. This voltage condition, which, in effect, may be considered as a stretched input video signal 12, is processed to remove the effect of the bias pulse and applied through an amplifier 33 to actuate an analog to digital converter or other recording apparatus 34. If the polarity detector 20 ascertains that the input video signal 12 is of negative polarity, then the pulse 21 applied to the control logic in conjunction with the delayed trigger pulse 11 effectuates the generation of a polarity bit pulse 35 on a lead 36. If the input video pulse 12 is of positive polarity, then the delayed trigger input pulse is ineffective to change the voltage condition impressed on lead 36 which condition is indicative of the receipt of a positive video pulse 12. The voltage condition on lead 36 may be applied to the recording equipment to indicate the polarity of the recorded input video pulse.

The input trigger pulse 11 is also effective to actuate the control logic to generate a reset pulse 37 on a lead 38 running to the peak detector 31. This pulse 37 is delayed in time a sufficient amount to enable the analog-to-digital converter to complete its operation whereafter peak detector is reset in anticipation of another cycle of operation of the system.

POLARITY DETECTOR AND LOGIC CONTROL CIRCUITS

The logic control (see FIG. 3) as previously explained, provided all the timing and control pulses for operating the other components. The input trigger pulse 11 applied through the terminal 15 is buffered by a pair of inverters 39 and 40 to produce a positive going pulse 41. Pulse 41 is applied to a pair of delay lines 42 and 43 which, respectively, include delay components 44, 45, and 46 of the one-shot multivibrator type. The outputs of the one-shot multivibrators 45 and 46 are applied to an AND gate 47 to control the application of the gating pulse 14 over the lead 16 running to the video gate 18. As previously mentioned, the gating pulse 14 is utilized to condition the video gate 18 to sample and pass the input video signal to produce the gated video pulse 19.

Figure 4:
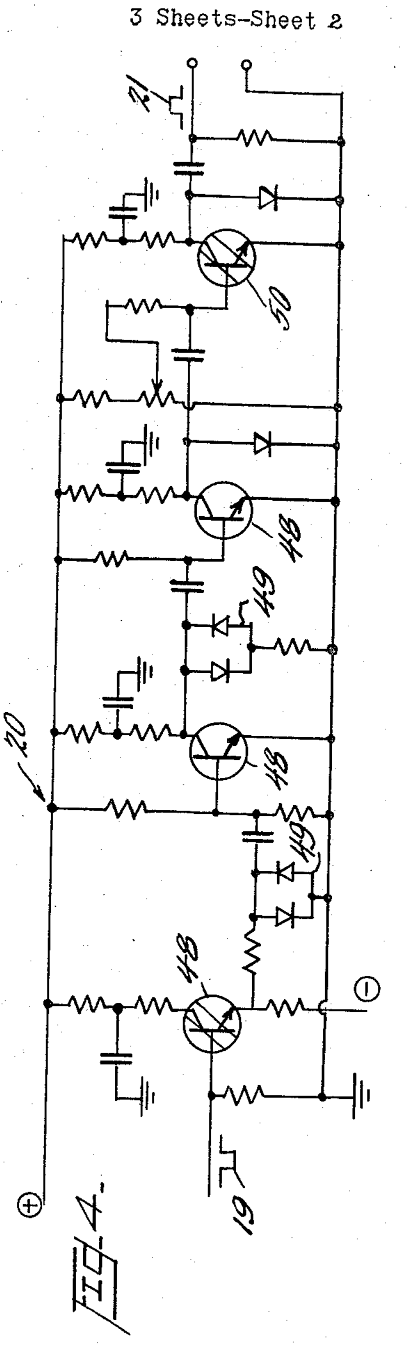
FIG. 4 is a circuit diagram illustrating the details of a polarity detector included as a component of the system shown in FIG. 1 for recognizing input signals of negative polarity.

Referring to FIG. 4, wherein the details of the polarity detector circuit 20 are shown as comprising limiter type pulse transistor amplifier 48, diode limiters 49, and an output transistor 50 which is biased to normally conduct. Transistor 48 responds to the application of a negative gated pulse 19 to apply a negative pulse to override the base bias applied to the transistor 50 and thereby generate a positive pulse 21 at its collector.

Referring again to FIG. 3, if the polarity detector 20 as shown in FIGS. 1 and 4 ascertains a negative input video pulse, then a positive going pulse 21 is applied to the control logic and is impressed over a lead 51 to one stage of a bistable multivibrator or flop-flop circuit 52. The bistable circuit 52 switches stages of operation and a left stage is rendered conductive to apply a conditioning potential over a lead 53 to an AND gate 54. The buffered inverted trigger pulse 41 is also applied to a delay component 56 which may also be a one-shot multivibrator. A delay output pulse 57 from delay component 56 is applied over leads 58 and 59 to gates 54 and 61. Inasmuch as gate 54 is conditioned by the operation of the left-hand stage of the multivibrator circuit 52, a positive going bias pulse 22 is impressed over the lead 23 to the mixer circuit 24.

If the incoming video pulse 12 is of positive polarity, the polarity detector 20 does not generate a pulse to set or switch the bistable multivibrator or flip-flop circuit 52. In this instance, the right-hand stage of the multivibrator 52 applies a conditioning potential over a lead 62 to condition the AND gate 61 for operation. When the delayed trigger pulse 57 is applied over leads 58 and 59, the now conditioned AND gate 61 responds by impressing the positive going bias pulse 29 over the lead 30 running to the mixer circuit 24.

The multivibrator 52 is reset by a delayed pulse generated in response to the application of the inverted trigger pulse 41 to a pair of serially connected delay circuits 71 and 72 which may be of the one-shot multivibrator type. The delayed operation of the circuits 71 and 72 is of sufficient time duration to permit the impression of bias pulses 22 or 29 on lead 23 or 30.

PHASE INVERTER AND BIAS MIXER CIRCUIT

Figures 5, 6:
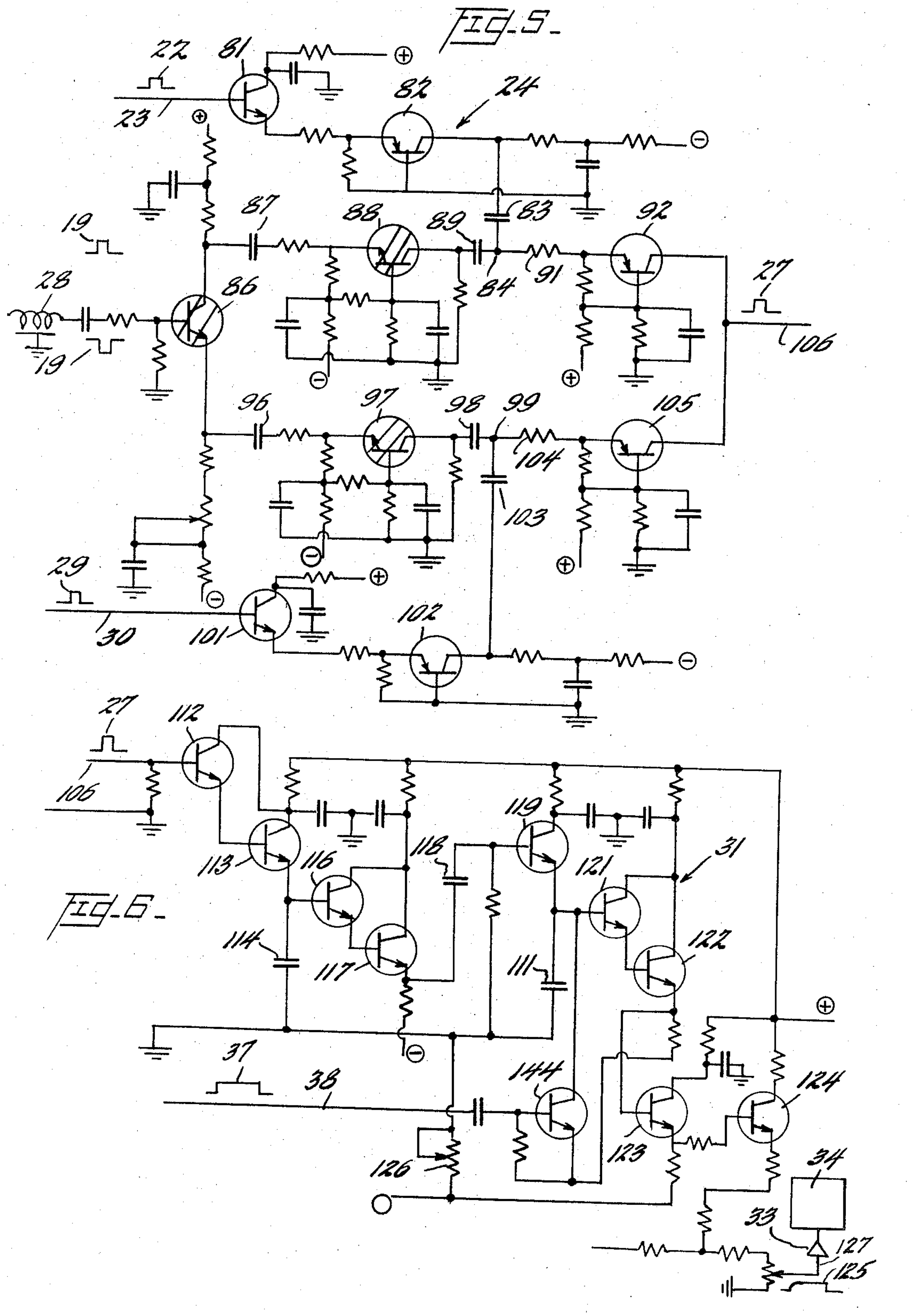
FIG. 5 is a circuit diagram illustrating the details of a phase inverter and bias mixer circuit of FIG. 1 and which functions to convert bipolar input pulses into unipolar output pulses.
FIG. 6 is a circuit diagram illustrating the details of a peak detector shown in FIG. 1 for stretching the unipolar output pulses from the circuit shown in FIG. 5.

The phase inverter and bias mixer circuit generally designated by the reference number 24 and shown in detail in FIG. 5, is designed to amplify the delayed input video pulse 19 and algebraically add it to either the bias pulse 22 or 29 impressed on the lead 23 or 30 to produce a composite positive going output signal 27. Assume first that the input video signal is of negative polarity, then a positive bias pulse 22 will be impressed on the lead 23 to operate an emitter follower transistor buffer 81 which, in turn, actuates a grounded base transistor amplifier 82 to impress a positive potential through a capacitor 83 to a mixing or summation junction point 84. The negative delayed gated video pulse 19 passes through the delay line 28 to a normally conducting transistor 86, operating as a class A amplifier, to decrease the conductivity of this transistor whereupon its collector potential rises and this rise is impressed through a capacitor 87 to the emitter of a normally conducting transistor 88. The conduction of transistor 88 is decreased, thus, its collector potential rises to impress a positive going pulse through a capacitor 89 to the junction joint 84. It may be appreciated that the video pulse from amplifier 88 is mixed with the bias pulse from transistor 82 at mixing point 84. The algebraic summation of these pulses occurs across a resistor 91 and results in the application of a positive going pulse to the emitter of a transistor amplifier 92. Transistor 92 is thus rendered conductive to generate the positive going composite output pulse 27.

If the input video pulse 19 from the delay line 28 is positive, then the normally conducting transistor inverter 86 is driven into a greater state of conduction. The increase in conduction of the inverter 86 results in a rise in emitter potential which is impressed through a capacitor 96 to the emitter of a common base transistor amplifier 97. The conduction of transistor 97 is decreased so that an accompanying rise in its collector potential is impressed through a capacitor 98 to a mixing or summation junction point 99. The control logic 13 impresses a bias potential 29 over the lead 30 to the base of an emitter follower transistor 101 which is rendered conductive to operate a grounded base transistor amplifier 102. The collector potential of transistor 102 rises and is impressed through a capacitor 103 to the mixing point 99. At the mixing point 99, the amplified bias pulse 29 is algebraically added to the input video pulse across a summation resistor 104. The composite pulse generated at the mixing point 99 is impressed on an emitter of a transistor amplifier 105, thus, rendering this transistor conductive. The amplified positive pulse appearing at the collector of transistor 105 now appears as the composite signal 27 on a lead 106 running to the peak detector 31.

VIDEO PEAK DETECTOR

The composite, bias, and video pulse 27 is impressed over the lead 106 to the video peak detector 31 shown in FIG. 6 wherein it is utilized to charge a capacitor 111 to a value representative of the magnitude of the original input video pulse 12 plus the bias pulse 22 or 29. More particularly, the composite pulse 27 is applied through a pair of transistor emitter followers 112 and 113 to charge a pre-stretching capacitor 114. After the charge builds up on capacitor 114, a second pair of transistor emitter followers 116 and 117 are operated to charge a capacitor 118. The accumulation of a charge on capacitor 118 initiates operation of a transistor 119. Conduction of transistor 119 provides charging current for the capacitor 111. The charge that accumulates on the relatively large capacitor 111 is representative of the original input video pulse 12 plus the bias pulse 22 or 29. The charge accumulated on the capacitor 111 initiates conduction of transistor emitter followers 121 and 122 which, in turn, control the conduction of transistor emitter followers 123 and 124. However, the compound emitter followers 119 and 121 are selected to have a sufficiently high input impedance to preclude the discharge of the capacitor 111 until the recorder or encoder 34 has had an opportunity to operate.

The positive potential applied to the emitter of transistor 123 is adjusted by a potentiometer 126 and thus the threshold point at which transistor 123 initiates conduction can be set so that this transistor will only conduct upon application of a potential which is greater than the bias pulse portion of the composite signal stored in capacitor 111. More specifically, transistor 123 will only conduct in accordance with the video input pulse portion of the composite input signal 27. In other words, the charge accumulated on capacitor 111 must be greater than that due to the bias pulse 22 or 29 in order that the transistor 123 operates. Conduction of transistor 123 is followed by conduction of transistor 124 to apply an analog voltage condition 125 (see FIGS. 1 and 2) on lead 127 which is directly proportional to the input video signal 12. The potentiometer 126 associated with transistor 124 may be adjusted to establish a zero voltage reference for the voltage condition impressed on lead 127.

Returning now to FIG. 3, it will be noted that the output from delay component 71 is impressed through further delay components 141 and 142 to impress the positive going reset pulse 37 on the lead 38 running to the video peak detector 31 (see FIG. 6). The positive going reset pulse 37 impressed on lead 38 initiates conduction of a grounded emitter transistor 144 which is connected through its collector to the capacitor 111. Conduction of transistor 144 completes a discharge circuit for capacitor 111 to reset the video peak detector 31 for another cycle of operation.

The buffered trigger pulse 41 (see FIG. 3) is also impressed through delay components 151 and 152 to apply a delayed pulse 153 over a lead 154 (see FIG. 1) to condition the analog digital converter 34 for operation in response to the stretched voltage condition 125 impressed on the lead 127. It is during this period of the pulse 153 that the encoder 34 is enabled to respond to the stretched voltage condition 125 (see FIG. 2).

Figure 3:
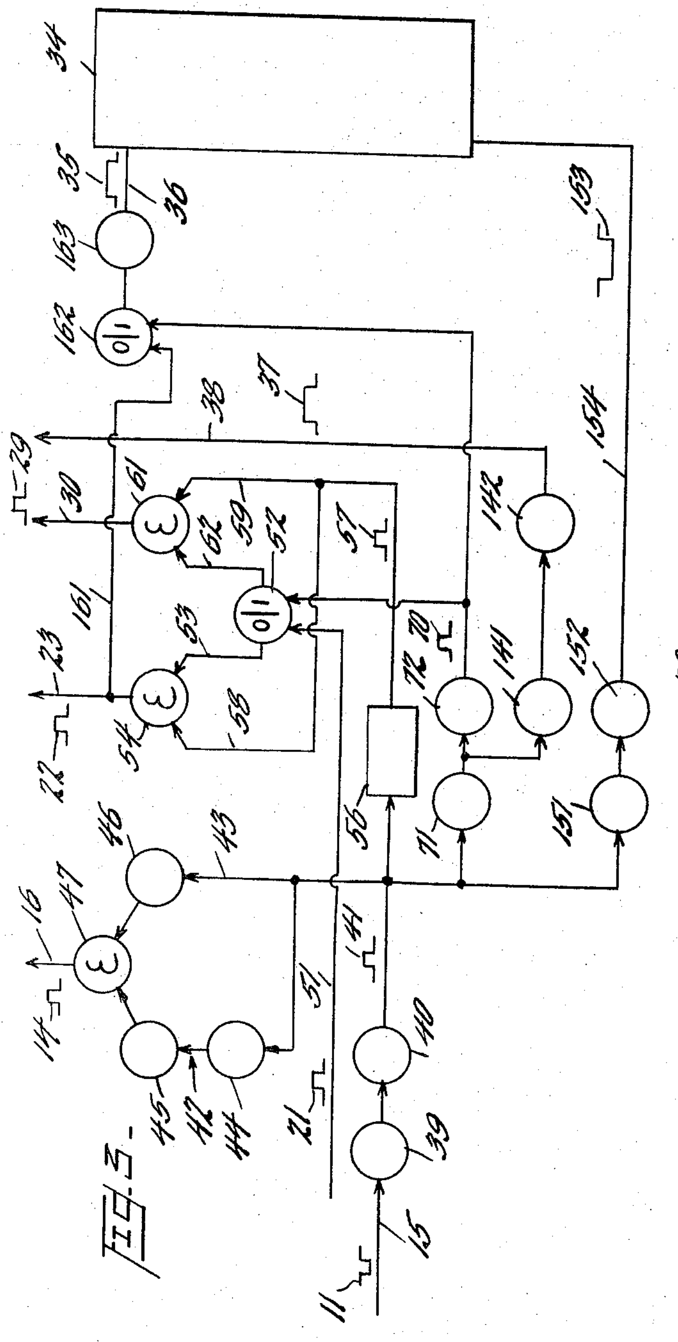
FIG. 3 is a schematic digram of components included in a logic or control circuit for operating the various components shown in FIG. 1.

Still referring to FIG. 3, it will be noted that the output of the gate 54 which is indicative of the receipt of a negative input video pulse 12 is also impressed over a lead 161 to set a bistable multivibrator circuit 162. When the multivibrator 162 is set, and output pulse is produced which is impressed through a transistor inverter 163 to impress the positive going pulse 35 on the lead 36 which is indicative of a negative input video pulse 12. This information may be recorded or displayed on the encoder to represent the polarity of the incoming video pulse. When the input video pulse 12 is positive, the multivibrator 162 does not change state, therefore, the voltage condition impressed on lead 36 does not change which lack of change is indicative of a positive input video pulse 12. The multivibrator 162 is reset by the reset pulse 70 emanating from the delay circuits 71 and 72.

It is to be understood that the above-described arrangement of circuit components and selection of circuit elements are merely illustrative of an application of the principles of this invention and many other changes may be made without departing from the invention.

What is claimed is:

1. In a system for converting input bipolar signals into unipolar signals,
a pair of normally unoperated mixing circuits for combining said input signals with bias signals to produce unipolar signals,
means responsive to input signals of a first polarity for applying a bias signal to condition the first of said mixing circuits,
means responsive to input signals of a second polarity for applying a bias signal to condition the second of said mixing circuits, and
means responsive to said bipolar signals for applying input signals of said first polarity to operate said first conditioned mixing circuit and for applying input signals of said second polarity to operate said second conditioned mixing circuit.

2. In a system for converting bipolar input pulses into unipolar output pulses,
a pair of normally unoperated circuits for mixing the input pulses with bias pulses,
a switching circuit for selectively applying bias pulses of said first polarity to one or the other of said mixing circuits,
bias pulses means rendered effective during receipt of a input pulse of a first polarity and operative in conjunction with said switching circuit for applying bias pulses of said first polarity to a first said mixing circuit,
a polarity detector operated by receipt of input pulses of a second polarity for operating said switching circuit to apply bias pulses of said first polarity to a second of said mixing circuits, and
means responsive to input pulses of said first and second polarity for selectively applying pulses of said first polarity to said respective first and second mixing circuits to produce output pulses of said first polarity during receipt of said bias pulses.

3. In a bipolar signal receiving system,
a pair of mixing circuits, each having a pair of input circuits, for generating a composite signal representative of the magnitudes of the signals applied to the respective pairs of input circuits,
means responsive to an input signal of a first polarity for generating and applying a biasing pulse to a first input circuit of a first of said mixing circuits.
means responsive to an input signal of a second polarity for generating and applying a biasing pulse to a first input circuit of said second mixing circuit,
means responsive to an input signal of said first polarity for amplifying and applying said input signal to the second input circuit of said first mixing circuit during the time the biasing pulse is applied to the associated first input circuit, and
means responsive to an input signal of said second polarity for inverting the polarity and then amplifying and applying said input signal to the second input circuit of said second mixing circuit during the time the biasing pulse is applied to the associated first input circuit.

4. In a system for converting a bipolar signal pulse into an analog voltage condition,
a pair of mixer circuits each having one branch responsive to an applied input signal pulse of a different predetermined polarity,
each of said one branches including facilities responsive to said applied signal for producing a mixer signal of a same predetermined polarity,
each of said mixer circuits including a second branch for receiving and applying a pulse of said same predetermined polarity to the output of said associated first branch,
switching means operated in accordance with the polarity of said bipolar signal pulse for generating and applying coincidentally a pulse to one or the other of said second branches at the time that the mixer signal is received from the associated first branch, and means responsive to the coincidental output of pulses from said first and second branches of a mixing circuit for producing an analog voltage condition indicative of the bipolar signal pulse.

5. In a pulse converting system for converting information pulses of a first or second polarity wherein each of said information pulses is preceded by a trigger pulse, bistable means normally operative in a first state for controlling the generation of first bias pulses, means responsive to information pulses of a first polarity for switching the state of operation of said bistable means to control the generation of second bias pulses, means responsive to information pulses of said first polarity for generating first video pulses of said second polarity, means responsive to information pulses of said second polarity for generating second video pulses of said second polarity, means operated by said trigger pulses and in conjunction with said bistable means for generating first and second bias pulses, means responsive to the receipt of a first video pulse and first bias pulse for generating a composite pulse of said second polarity, means responsive to the receipt of a second video pulse and a second bias pulse of said second polarity.

6. In a pulse converting system of the type defined in claim 5, means for storing the composite pulse, and means responsive to each trigger pulse for subsequently discharging said storage means.

7. In a circuit for producing an analog voltage condition in response to the receipt of bipolar pulse signals, a first mixing circuit having a pair of input branch circuits for combining a pair of input pulses to produce an output pulse of a predetermined polarity, means responsive to a pulse signal of a first polarity for applying said pulse signal to a first branch of said first mixing circuit, a second mixing circuit having a pair of input branch circuits for combining a pair of input pulses to produce an output pulse of said predetermined polarity, means responsive to a pulse signal of a second polarity for inverting and applying said pulse signal to a first branch of said second mixing circuit, means for generating a pulse of said predetermined polarity, switching means for selectively applying said generated pulse to the second branches of said mixing circuits, means responsive to an input signal of said second polarity for operating said switching means to apply the generated pulse to the second branch of said second mixing circuit, and means responsive to the output pulse from either mixing circuit for producing an analog voltage condition indicative of the magnitude of the input pulse signal.

8. In a system for converting bipolar input intelligence signals into unipolar output signals.

a first normally unoperated mixing circuit having a pair of input paths for generating a composite output pulse in response to simultaneous application of pulses of a first polarity to said input paths, a second normally unoperated mixing circuit having a pair of input paths for generating a composite output pulse in response to simultaneous application of pulses of said first polarity to said input paths, first means responsive to input signals of a first polarity for generating and applying bias pulses of said first polarity to a first path of said first mixing circuit to condition said first mixing circuit, second means responsive to input signals of second polarity for generating and applying bias pulses of said first polarity to a first path of said second mixing circuit to condition said second mixing circuit, means responsive to the polarity of said bipolar input intelligence signals for accordingly generating and applying intelligence gating signals to said associated conditioned mixing circuit to generate composite output pulses, means for storing said composite output pulses, and means actuated only in accordance with the intelligence portions of said stored composite output pulses for generating unipolar output signals.

9. In a system for converting bipolar input pulses into unipolar output pulses, a transistor having a base, a collector and an emitter, means for operating said transistor as a class A amplifier, a first mixing circuit having a pair of input paths, a second mixing circuit having a pair of input paths, means connecting a first path of said first mixing circuit to the collector of said transistor, means connecting a first path of said second mixing circuit to the emitter of said transistor, means responsive to input pulses of a first polarity for applying biasing pulses of said first polarity to the second path of said first mixing circuit, means responsive to input pulses of a second polarity for applying biasing pulses of said first polarity to the second path of said second mixing circuit, and means for applying said input signals to the base of said transistor during the time that biasing pulses are applied to said second paths of said mixing circuits to produce unipolar output pulses.

10. In a system for converting bipolar input signals preceded by trigger signals into unipolar output signals, a bistable multivibrator having a pair of output circuits, a pair of AND gates each having an input connected to one of said output circuits, means responsive to the polarity of said input signals for selectively operating said bistable multivibrator to apply conditioning potential to the input of the respective AND gates, means responsive to each trigger pulse for operating the conditioned AND gates to generate bias pulses, a pair of mixing circuits having a pair of input circuits and an output circuit, means connecting a first input circuit of a first said mixing circuit to one of said AND gates, means connecting a first input circuit of a second of said mixing circuits to the other of said AND gates, and means responsive to the polarity of said input signals for accordingly applying said input signals to the second input circuits of said mixing circuits during the time that the associated first input circuit receives bias pulses.

No references cited.

MAYNARD R. WILBUR, *Primary Examiner.*

ALAN L. NEWMAN, *Assistant Examiner.*